US012646801B2

(12) United States Patent
Yu et al.

(10) Patent No.: US 12,646,801 B2
(45) Date of Patent: Jun. 2, 2026

(54) SECONDARY BATTERY

(71) Applicant: LG ENERGY SOLUTION, LTD., Seoul (KR)

(72) Inventors: Sung Hoon Yu, Daejeon (KR); Nak Gi Sung, Daejeon (KR); Gyu Ok Hwang, Daejeon (KR); Ju Hyeon Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 507 days.

(21) Appl. No.: 18/278,348

(22) PCT Filed: Jan. 18, 2023

(86) PCT No.: PCT/KR2023/000886
§ 371 (c)(1),
(2) Date: Aug. 22, 2023

(87) PCT Pub. No.: WO2023/140620
PCT Pub. Date: Jul. 27, 2023

(65) Prior Publication Data
US 2024/0154245 A1     May 9, 2024

(30) Foreign Application Priority Data

Jan. 19, 2022     (KR) ........................ 10-2022-0007919

(51) Int. Cl.
*H01M 50/30*          (2021.01)
*H01M 50/342*         (2021.01)
(Continued)

(52) U.S. Cl.
CPC ....... *H01M 50/394* (2021.01); *H01M 50/342* (2021.01); *H01M 50/367* (2021.01); *H01M 50/578* (2021.01)

(58) Field of Classification Search
CPC ................................................. H01M 50/394
See application file for complete search history.

(56) References Cited

U.S. PATENT DOCUMENTS 5,830,594 A     11/1998   Malay
2010/0273047 A1  10/2010   Kunoike et al.
(Continued)

FOREIGN PATENT DOCUMENTS

CN      1866581 A     11/2006
CN      203760546 U    8/2014
(Continued)

OTHER PUBLICATIONS

Extended European Search Report for European Application No. 23743466.7, dated Feb. 7, 2025.
(Continued)

*Primary Examiner* — Brian R Ohara
(74) *Attorney, Agent, or Firm* — Birch, Stewart, Kolasch & Birch, LLP

(57) ABSTRACT
A secondary battery includes an electrode assembly, a battery can in which the electrode assembly is accommodated, a cap assembly including an upper cap plate defining a positive terminal, the cap assembly being disposed above the battery can, a gasket surrounding a rim of the cap assembly and interposed between the battery can and the cap, and a porous member disposed between the cap assembly and the gasket to discharge gas generated in the battery can to outside the battery can.

17 Claims, 8 Drawing Sheets

(51) Int. Cl.
  H01M 50/367 (2021.01)
  H01M 50/578 (2021.01)

(56) References Cited

U.S. PATENT DOCUMENTS

| | | | |
|---|---|---|---|
| 2011/0064979 A1 | 3/2011 | Yokoyama | |
| 2011/0171507 A1 | 7/2011 | Kim | |
| 2012/0015218 A1* | 1/2012 | Lee | H01M 50/30 |
| | | | 429/53 |
| 2019/0363315 A1* | 11/2019 | Kim | H01M 50/30 |
| 2022/0166048 A1 | 5/2022 | Noh | |
| 2023/0231234 A1 | 7/2023 | Hwang et al. | |

FOREIGN PATENT DOCUMENTS

| | | | |
|---|---|---|---|
| JP | 48-58974 U | | 8/1973 |
| JP | 50-7120 U | | 1/1975 |
| JP | 5-159765 A | | 6/1993 |
| JP | 2004-43745 A | | 2/2004 |
| JP | 2014-212034 A | | 11/2014 |
| JP | 2018-14160 A | | 1/2018 |
| JP | 2018-181544 A | | 11/2018 |
| JP | 6757500 B2 | | 9/2020 |
| JP | 2023-525541 A | | 6/2023 |
| KR | 20-0146197 Y1 | | 6/1999 |
| KR | 10-2011-0015656 A | | 2/2011 |
| KR | 10-2011-0035483 A | | 4/2011 |
| KR | 10-2012-0052586 A | | 5/2012 |
| KR | 10-2013-0019706 A | | 2/2013 |
| KR | 10-1396703 B1 | | 5/2014 |
| KR | 10-2016-0040115 A | | 4/2016 |
| KR | 10-2017-0032546 A | | 3/2017 |
| KR | 10-2018-0025734 A | | 3/2018 |
| KR | 10-2019-0045150 A | | 5/2019 |
| KR | 10-2019-0086307 A | | 7/2019 |
| KR | 10-2021-0020662 A | | 2/2021 |
| KR | 10-2021-0075476 A | | 6/2021 |
| KR | 10-2022-0007511 A | | 1/2022 |
| WO | WO 2015/079672 A1 | | 6/2015 |

OTHER PUBLICATIONS

International Search Report for PCT/KR2023/000886 mailed on May 8, 2023.

* cited by examiner

[FIG. 1A]
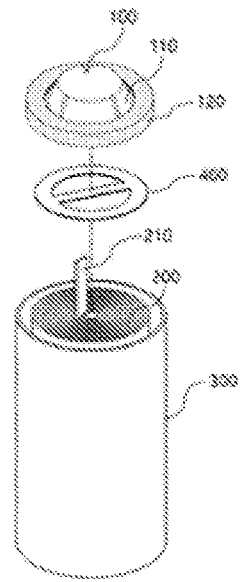
[FIG. 1B]
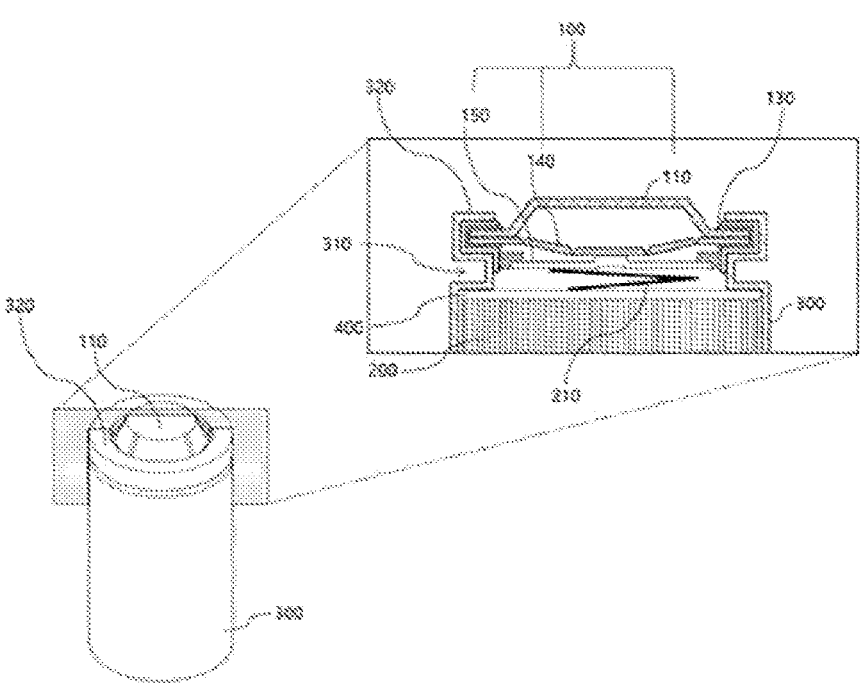

[FIG. 2A]
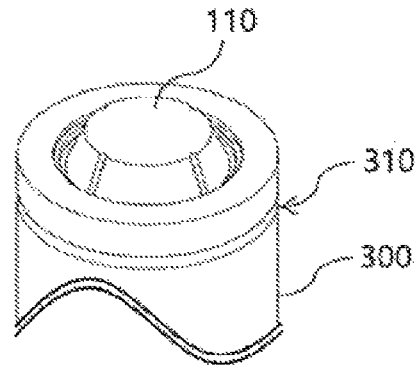
[FIG. 2B]
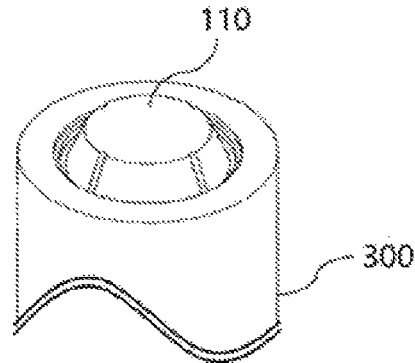

[FIG. 3]
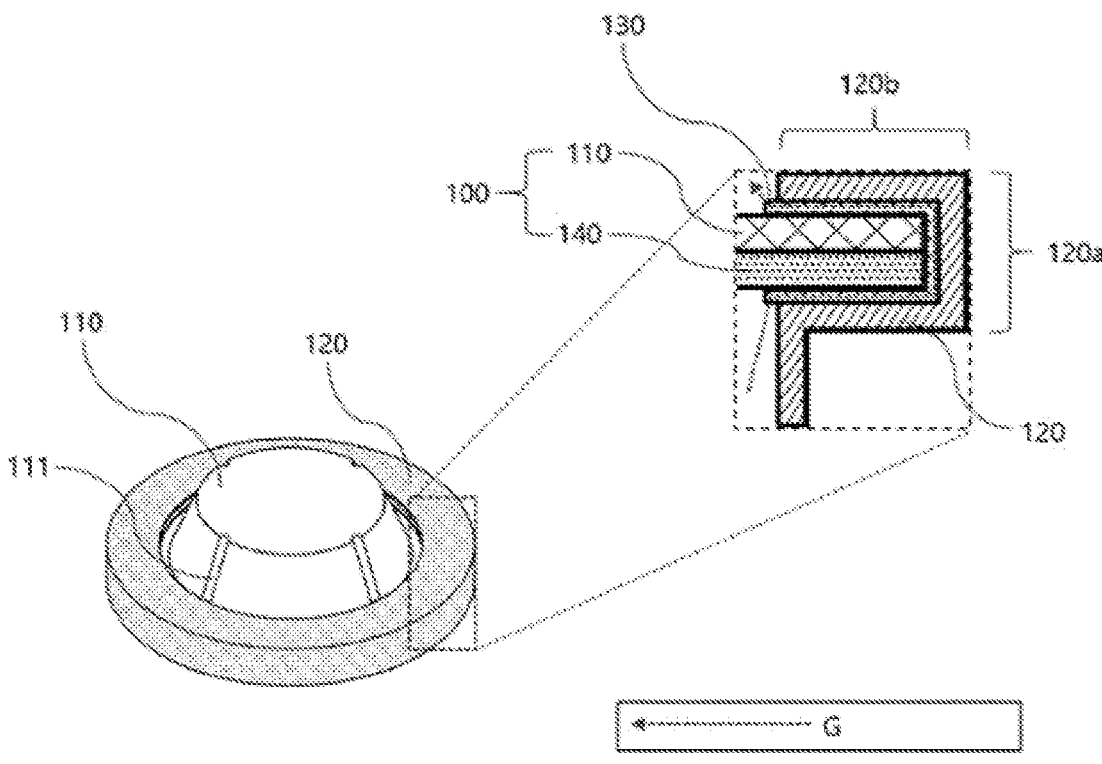
[FIG. 4]
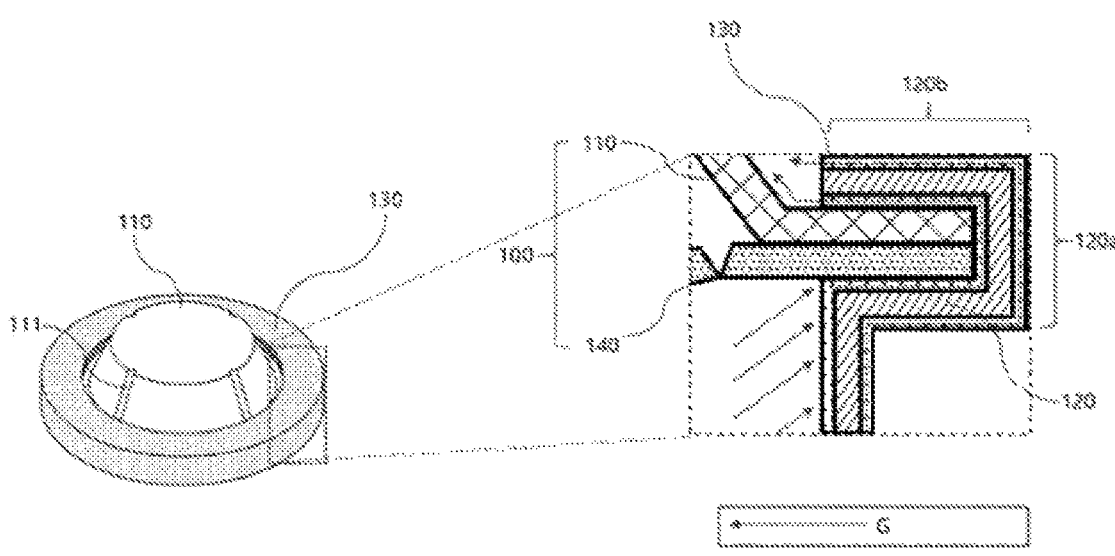

[FIG. 5]
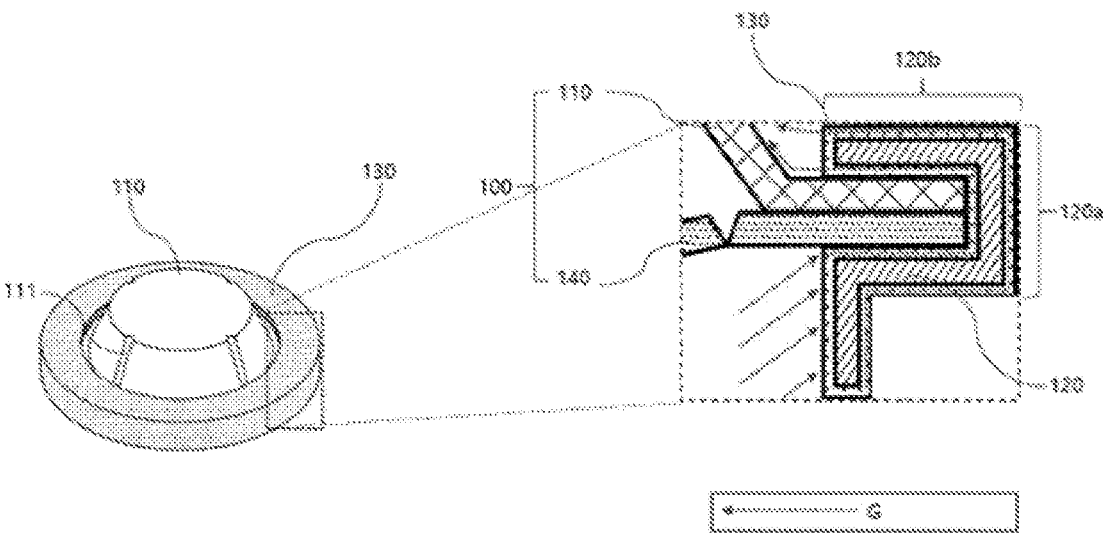
[FIG. 6]
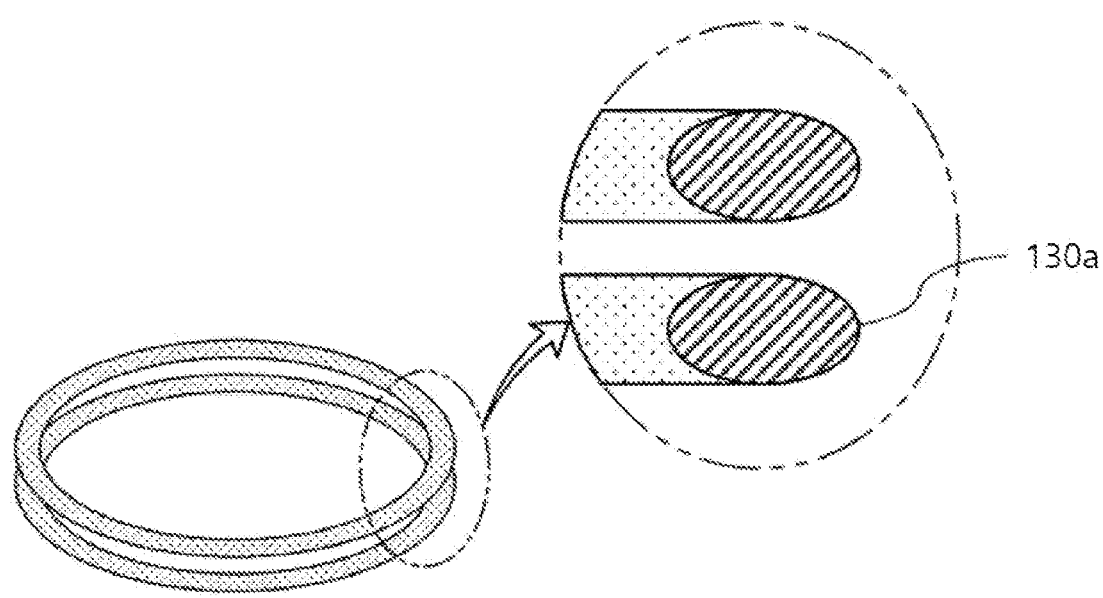

[FIG. 7]
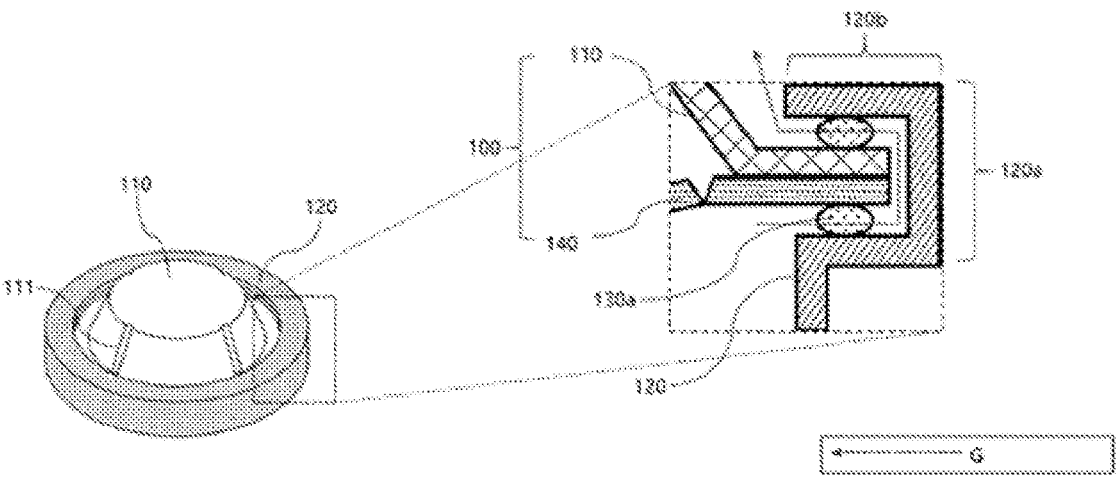
[FIG. 8]
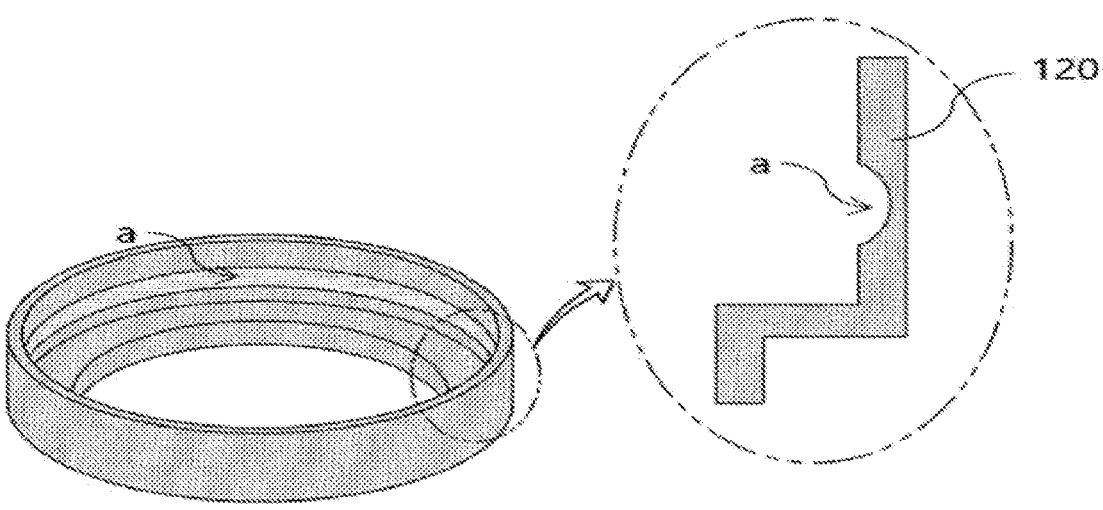

[FIG. 9]
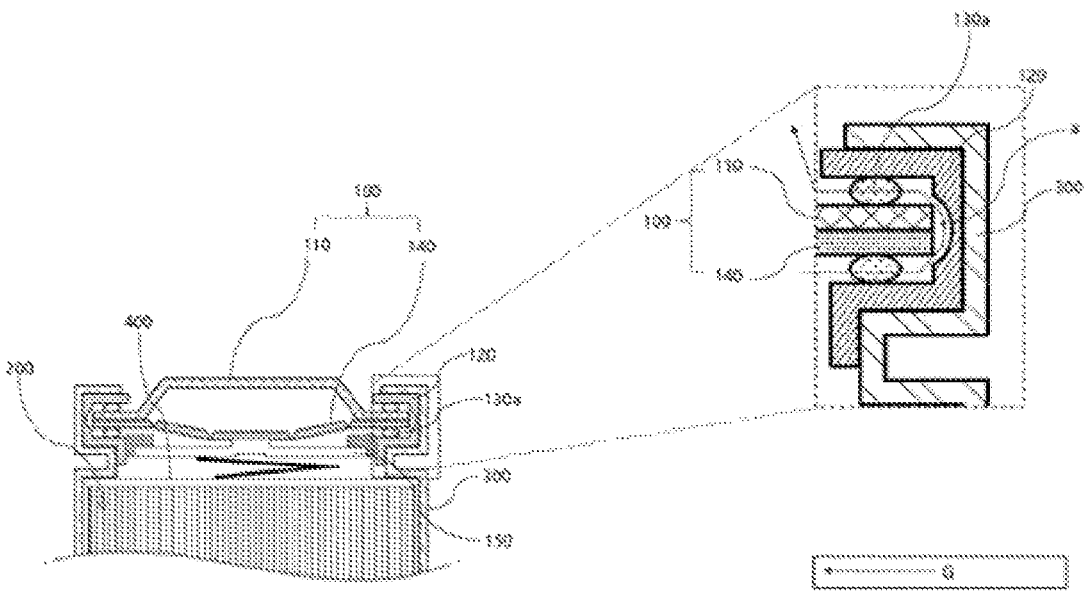
[FIG. 10]
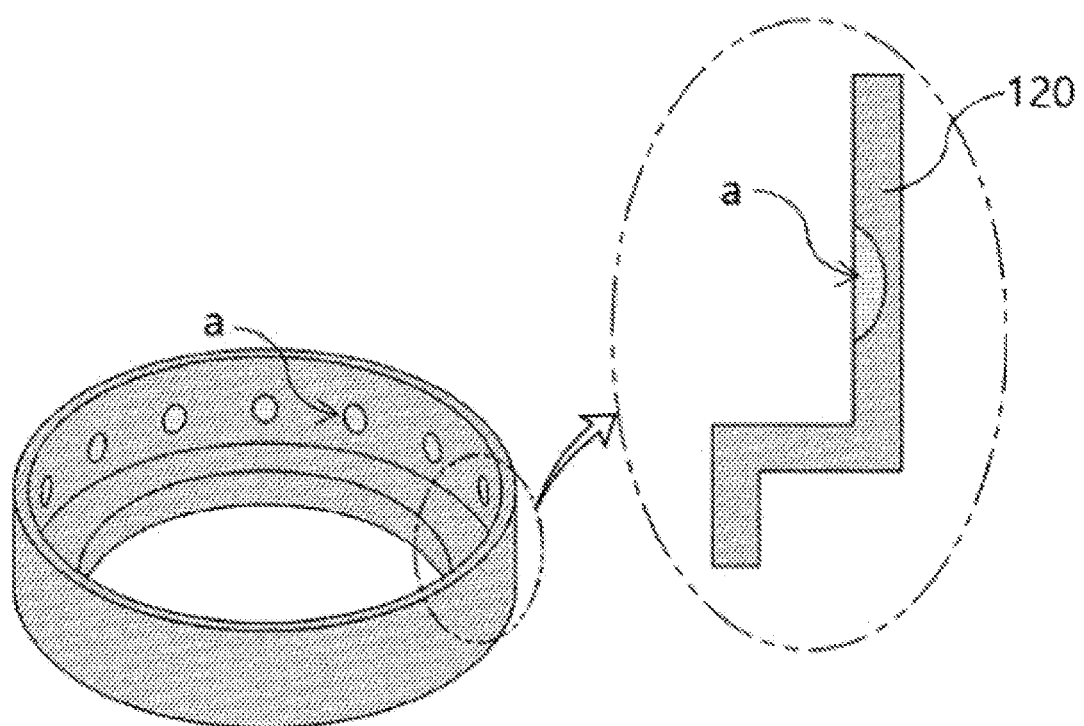

[FIG. 11]
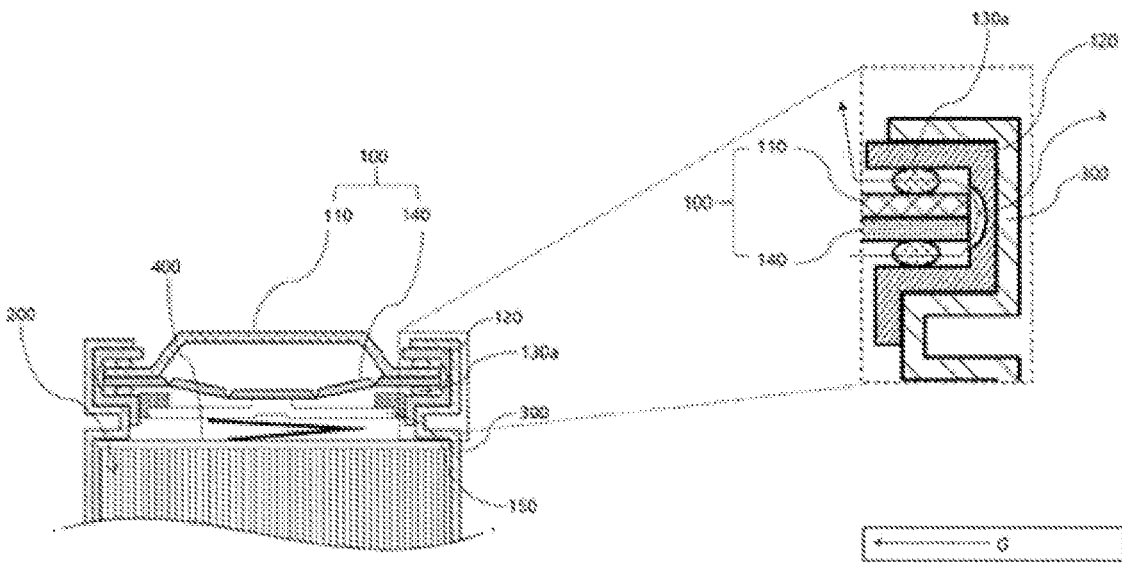
[FIG. 12]
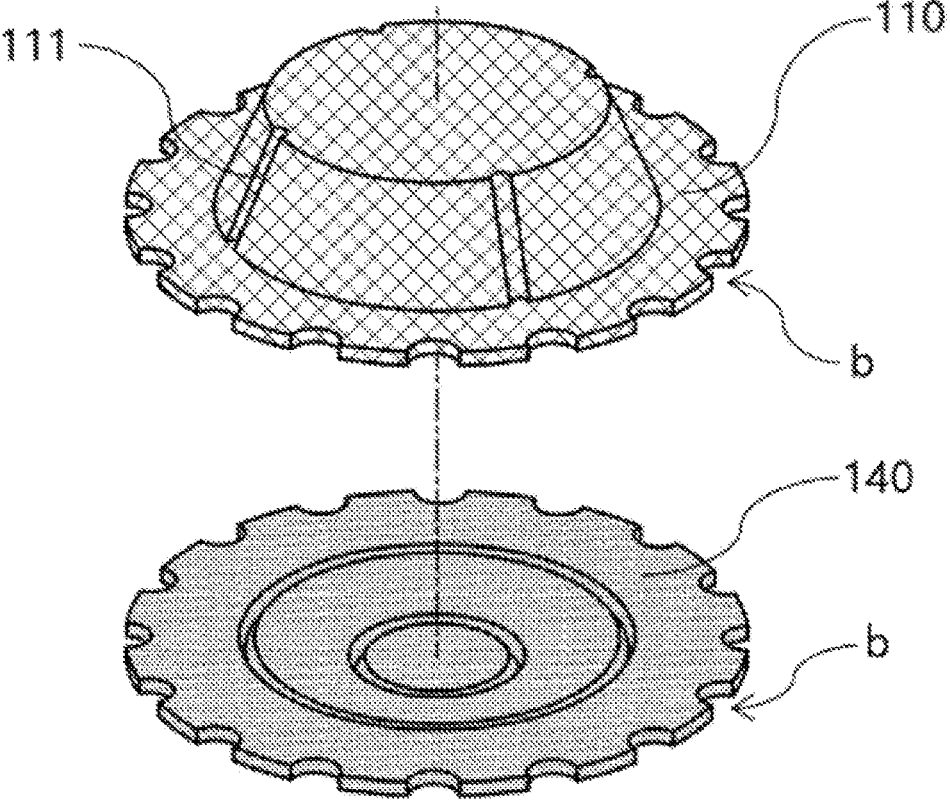

[FIG. 13]
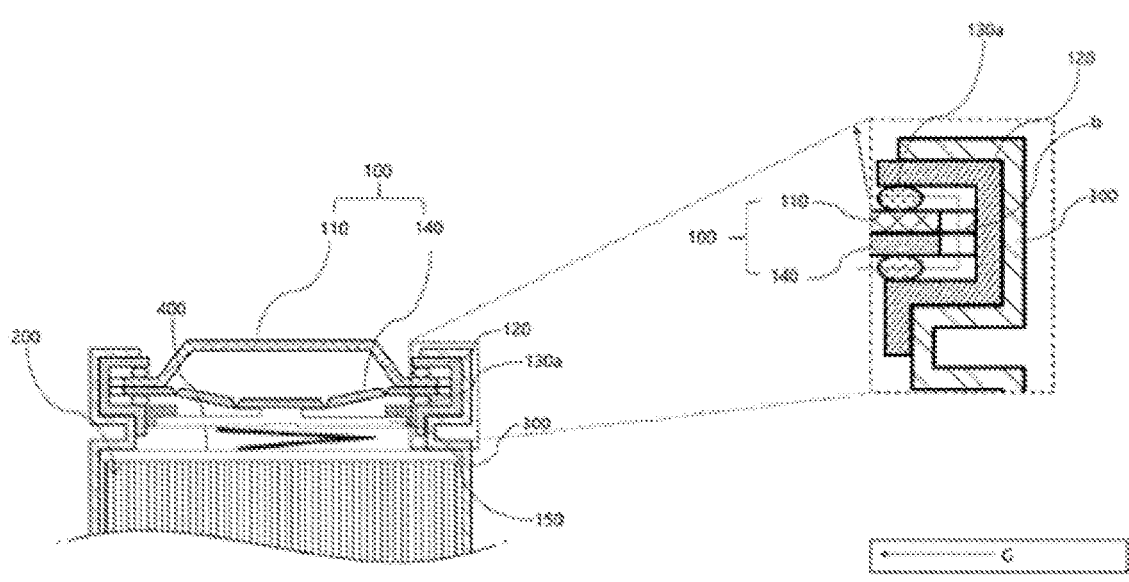

SECONDARY BATTERY

TECHNICAL FIELD

The present invention relates to a secondary battery, and more specifically, a secondary battery having a porous member capable of gas venting.

This application claims the benefit of priority based on Korean Patent Application No. 10-2022-0007919 filed on Jan. 19, 2022, and all contents disclosed in the literature of the Korean Patent Application are included as part of this specification.

BACKGROUND TECHNOLOGY OF THE INVENTION

Depending on the shape of the battery case, the secondary battery is classified into a cylindrical battery and a prismatic battery in which an electrode assembly is embedded in a cylindrical or prismatic metal can, and a pouch-type battery in which the electrode assembly is embedded in a pouch-type case made of an aluminum laminate sheet. Among them, the cylindrical battery has the advantage of having a relatively large capacity and structural stability.

In addition, the electrode assembly built into the battery case is a power generating device capable of charging and discharging with a stacked structure of a positive electrode/a separator/a negative electrode. The electrode assembly is classified into a jelly-roll type in which a long sheet-type positive electrode and negative electrode are wound with a separator interposed therebetween, and a stack-type in which a plurality of positive and negative electrodes with a predetermined size are sequentially stacked with a separator interposed therebetween. Among them, the jelly-roll type electrode assembly has advantages of being easy to manufacture and having a high energy density per weight.

The cylindrical secondary battery is manufactured by accommodating a jelly-roll type electrode assembly in a cylindrical case, injecting an electrolyte into the cylindrical case, and then coupling a cap having an electrode terminal formed at an open top of the case.

Meanwhile, a large amount of gas may be generated in the process of activating the secondary battery, and the large amount of gas generated may deteriorate the performance of the secondary battery and cause safety problems.

In general, pouch-type secondary batteries and prismatic secondary batteries remove gases in advance by adding an activation gas discharging process during the manufacturing process. However, on the other hand, the cylindrical secondary battery has a problem in that an activation gas discharging process cannot be used due to structural characteristics of maintaining an airtight seal after electrolyte injection.

Cylindrical secondary batteries in which activation gas is not separately discharged in the manufacturing process through the activation gas discharging process may easily increase in internal pressure during actual use, which may cause a major accident such as battery explosion.

Therefore, there is a need to develop a cylindrical secondary battery having a new structure that can solve the problem of increase in the internal pressure of the cylindrical battery.

PRIOR ART DOCUMENTS

Korean Patent Publication No. 10-2012-0052586

DESCRIPTION OF THE INVENTION

Technical Problem

Therefore, the present invention has been devised to solve the above problems, and it is directed to provide a secondary battery capable of easily removing an activation gas generated inside a battery can in which an electrode assembly is accommodated during the process of activating or using the secondary battery.

Other objects and advantages of the present invention can be understood by the following description, and will be more clearly understood by the exemplary embodiments of the present invention. In addition, the objectives and advantages of this invention can be easily understood to be realized by the means and combinations indicated in the scope of the patent claims.

Technical Solution

According to the present invention, a secondary battery including: an electrode assembly; a battery can in which the electrode assembly is accommodated; a cap assembly including an upper cap plate defining a positive terminal, the cap assembly being disposed above the battery can; a gasket surrounding a rim of the cap assembly and interposed between the battery can and the cap assembly; and a porous member disposed between the cap assembly and the gasket to discharge gas generated in the battery can to outside the battery can is provided.

In addition, the cap assembly further includes a safety vent coupled to a lower part of the upper cap plate, the safety vent protruding downward, and the safety vent may be configured to protrude upward and break when the pressure inside the battery can rises above a set pressure.

In addition, the cap assembly further includes a current blocking element having at least a part of an upper part electrically connected to the upper cap plate and a lower part electrically connected to the electrode assembly, and the current blocking element may be configured to block electrical connection with at least one among the upper cap plate and the electrode assembly when the pressure inside the battery can rises above a set pressure.

Specifically, the porous member may be coupled to at least one among an inner circumferential surface of the gasket facing the cap assembly and an outer circumferential surface of the cap assembly facing the gasket.

More specifically, the porous member may be additionally located on an outer circumferential surface of the gasket opposite to the battery can.

According to an exemplary embodiment, the porous member may be a porous film surrounding a rim of the gasket or the rim of the cap assembly.

According to another exemplary embodiment, the porous member may be a porous coating layer coated on a rim of the gasket or the rim of the cap assembly.

According to another exemplary embodiment, the porous member may be a porous ring extending along a circumference of the gasket and a circumference of the cap assembly.

Specifically, the porous film, the porous coating layer, and the porous ring may each have a thickness of 0.1 mm to 1.0 mm.

In addition, the porous member may have a pore size of 0.05 $\mu$m to 5.0 $\mu$m, and an air permeability at 1 kPa of 0.05 cm$^3$/s/cm$^2$ to 10 cm$^3$/s/cm$^2$.

Meanwhile, the gasket may include a side support part facing a side part of the cap assembly and a bending part extending from upper and lower ends of the side support part and bent toward the cap assembly to contact an upper surface and a lower surface of the cap assembly, wherein one or more porous rings may be disposed between the bending part of the gasket and the upper surface of the cap assembly and between the bending part of the gasket and the lower surface of the cap assembly, respectively.

On the other hand, a gas discharge passage connected to the porous ring may be located between an inner circumferential surface of the gasket and an outer circumferential surface of the cap assembly opposite to the inner circumferential surface of the gasket.

Specifically, a venting groove may be located on the inner circumferential surface of the gasket, the venting groove extending entirely or partially along the inner circumferential surface of the gasket, wherein the gas discharge passage may be located between the venting groove and the outer circumferential surface of the cap assembly.

More specifically, the venting groove may be provided as a plurality of venting grooves spaced apart along the inner circumferential surface of the gasket by a predetermined distance.

In addition, the outer circumferential surface of the cap assembly may include a plurality of concave parts spaced apart along the outer circumferential surface of the cap assembly by a predetermined distance, and wherein the gas discharge passage may be located between the concave parts and the inner circumferential surface of the gasket.

Advantageous Effects

According to the present invention, it is possible to prevent a phenomenon in which the pressure inside a secondary battery increases due to the gas generated in the secondary battery and the external shape of the battery can be deformed.

In addition, according to the present invention, it is possible to effectively prevent accidents such as an explosion of a secondary battery due to an increase in internal pressure of the secondary battery.

BRIEF DESCRIPTION OF THE DRAWINGS

FIGS. 1A and 1B are an exploded perspective view and a partial cross-sectional view of a secondary battery of the present invention.

FIGS. 2A and 2B show a battery can include in the secondary battery of the present invention and a modified example thereof.

FIG. 3 is a perspective view and a partial cross-sectional view of a cap assembly included in a secondary battery according to a first embodiment of the present invention and a gasket coupled thereto.

FIG. 4 is a perspective view and a partial cross-sectional view of a cap assembly included in a secondary battery according to a second embodiment of the present invention and a gasket coupled thereto.

FIG. 5 is a perspective view and a partial cross-sectional view of a cap assembly included in a secondary battery according to a third embodiment of the present invention and a gasket coupled thereto.

FIG. 6 is a perspective view and a partial cross-sectional view of a porous ring included in a secondary battery according to a fourth embodiment of the present invention.

FIG. 7 is a perspective view and a partial cross-sectional view of a cap assembly included in a secondary battery according to a fourth embodiment of the present invention and a gasket coupled thereto.

FIG. 8 is a perspective view and a cross-sectional view of a gasket included in a secondary battery according to a fifth embodiment of the present invention.

FIG. 9 is a cross-sectional view and a partially enlarged view of a secondary battery according to a fifth embodiment of the present invention.

FIG. 10 is a perspective view and a cross-sectional view of a gasket included in a secondary battery according to a sixth embodiment of the present invention.

FIG. 11 is a cross-sectional view and a partially enlarged view of a secondary battery according to a sixth embodiment of the present invention.

FIG. 12 is an exploded perspective view of a cap assembly of a secondary battery according to a seventh embodiment of the present invention.

FIG. 13 is a cross-sectional view and a partially enlarged view of a secondary battery according to a seventh embodiment of the present invention.

BEST MODE FOR CARRYING OUT THE INVENTION

Hereinafter, the detailed configuration of the present invention will be described in detail with reference to the accompanying drawings and various embodiments. The exemplary embodiments described below are illustrative to help understanding of the present invention, and the accompanying drawings are not drawn to scale and the dimensions of some components may be exaggerated to help understanding of the present invention.

Since the present invention may have various changes and various forms, specific exemplary embodiments are illustrated in the drawings and described in detail in the text. However, it should be understood that this is not intended to limit the present invention to a specific disclosed form, and includes all modifications, equivalents, and substitutes included in the spirit and scope of the present invention.

FIGS. 1A and 1B are an exploded perspective view and a partial cross-sectional view of a secondary battery of the present invention.

Referring to FIGS. 1A and 1B, a secondary battery according to the present invention includes an electrode assembly 200, a battery can 300, a cap assembly 100, and a gasket 120.

The electrode assembly 200 is accommodated in the battery can 300 with a positive electrode plate and a negative electrode plate disposed with a separator interposed therebetween. Here, the electrode assembly 200 is also called a jelly-roll because it is wound and arranged in a jelly roll shape. The electrode plates of the electrode assembly 200 are formed as a structure in which an active material slurry is applied on a current collector, and the slurry may be typically formed by stirring an active material, a conductor, a binder, a plasticizer, etc. in a solvent. It is preferable that a non-coated part to which slurry is not applied is present at the beginning and end of the current collector in the direction in which the electrode plates are wound, and an electrode lead 210 corresponding to each electrode plate may be attached to the non-coated part. In general, a positive lead is attached to the upper part of the electrode assembly 200 to be electrically connected to an upper cap plate 110, and a negative lead is attached to the lower part of the electrode assembly 200 to be electrically connected to the bottom of the battery can 300.

Meanwhile, an electrically insulating plate 400 may be disposed on the upper part of the electrode assembly 200, and the insulating plate 400 serves to insulate between the electrode assembly 200 and the upper cap plate 110.

The battery can 300 is made of a lightweight conductive metal material such as aluminum, stainless steel, or an alloy thereof, and has a cylindrical structure with an open part with the upper part open and a sealed bottom part opposite thereto. An electrolyte is accommodated together with the electrode assembly 200 in the inner space of the battery can 300.

A beading part 310 for mounting the cap assembly 100 may be formed on the upper part of the battery can 300. The beading part 310 is indented inside between the cap assembly 100 and the electrode assembly 200, and more specifically, the lower end part of the cap assembly 100 is settled and fixed to the upper part of the indented inner surface of the beading part 310, and the upper end part of the electrode assembly 200 may be positioned on the lower part of the indented inner surface of the beading part 310.

FIGS. 2A and 2B show a battery can 300 included in the secondary battery of the present invention and a modified example thereof.

Referring to FIG. 2A, a beading part 310 indented inwardly on the upper part of the battery can 300 extends along the circumference of the battery can 300. However, the battery can 300 of the present invention is not limited thereto, and the beading part 310 may not be formed in the battery can 300 of the present invention, as shown in FIG. 2B. In this case, a protruding part (not shown) may be formed on the inner surface of the battery can 300 protruding with a certain length so that the cap assembly 100 can be settled thereon.

For the convenience of understanding, the present invention will be described based on the battery can 300 on which the beading part 310 is formed.

After the cap assembly 100 is inserted into and settled inside the battery can 300, the upper end of the battery can 300 is bent toward the cap assembly 100 to form a crimping part 320.

The crimping part 320 serves to press and fix the upper surface of the cap assembly 100 to prevent the upper cap assembly 100 from escaping to the outside, and at the same time to completely seal the secondary battery from the outside. Specifically, the crimping part 320 is formed by the uppermost end of the battery can 300 covering and pressing the upper surface of the gasket 120 surrounding the rim part of the upper cap plate 110.

The cap assembly 100 of the present invention is inserted into the battery can 300 and placed on upper part of the battery can 300.

The cap assembly 100 includes an upper cap plate 110 disposed on the upper part to form a positive electrode terminal. More specifically, the upper cap plate 110 is disposed in a form protruding upward from the uppermost part of the cap assembly 100, and forms a positive terminal. Accordingly, the upper cap plate 110 electrically connects the secondary battery to the outside.

The upper cap plate 110 may be formed of a metal material such as stainless steel or aluminum in consideration of strength and conductivity.

As illustrated, the upper cap plate 110 has a shape in which a center part is protruded, and a side surface of the protruding center part has an inclined surface formed along the edge of the protruding center part.

The edge part of the upper cap plate 110 may be designed to maintain level with the bottom of the battery can 300, but is not limited thereto.

The diameter of the upper cap plate 110 is preferably the same as or slightly smaller than the inner diameter of the battery can 300 so that the upper cap plate can be inserted into the battery can 300.

A gas hole 111 through which gas can be discharged may be formed in the upper cap plate 110. The gas hole 111 may be formed, for example, on a side surface of the protruding center part of the upper cap plate 110, that is, on an inclined surface. Specifically, a safety vent 140 blocking an inner space connected to the gas hole 111 from the electrode assembly 200 may be further provided inside the cap assembly 100.

The safety vent 140 is coupled to the lower part of the upper cap plate 110, and has a shape that protrudes downward.

The safety vent 140 serves to discharge gas to the outside by protruding upward and breaking when the pressure inside the secondary battery rises above a set pressure.

In a usual condition, the gas generated inside the secondary battery cannot be discharged through the gas hole 111 due to the safety vent 140. However, when an abnormal phenomenon occurs in the electrode assembly 200 and an excessive amount of gas is generated and the gas pressure exceeds a certain value, the safety vent 140 breaks to discharge the gas filled inside to the outside, and the secondary battery explosion can be prevented.

As described above, the safety vent 140 is configured to break when the gas pressure inside the secondary battery increases to a certain level. For example, the safety vent may break when the gas pressure inside the secondary battery is 12 kgf/cm$^2$ to 25 kgf/cm$^2$.

The cap assembly 100 of the present invention may further include a current blocking element 150.

The current blocking element 150 is a component of the cap assembly 100 in which at least a part of the upper part of the current blocking element 150 is connected to the lower part of the safety vent 140. More specifically, the current blocking element 150 is disposed between the safety vent 140 and the electrode assembly 200.

The current blocking element 150 may block electrical connection with at least one among the upper cap plate 110 and the electrode assembly 200 when the pressure inside the battery can 300 rises above a set pressure. Specifically, in a normal state, the lower protruding part of the safety vent 140 is in contact with the current blocking element 150, but when the internal pressure (gas pressure) increases due to gas generation and the shape of the safety vent 140 is reversed, the electrical connection between the current blocking element 150 and the safety vent 140 may be blocked. Also, the lower part of the current blocking element 150 may be connected to the electrode assembly 200 through an electrode lead 210. Therefore, in a normal state, the current blocking element 150 allows a current flow between the electrode assembly 200 and the safety vent 140. The current blocking element 150 may be deformed or damaged along with the safety vent 140 due to an increase in internal pressure of the secondary battery, and as a result, electrical connection with the electrode assembly 200 may be blocked.

The cap assembly 100 of the present invention may further include a safety element (not shown) provided in the lower part of the upper cap plate 110. Preferably, the safety element is interposed between the upper cap plate 110 and the safety vent 140, and electrically connects the upper cap plate 110 and the safety vent 140. The safety element is to block the flow of current inside the battery due to overheating of the battery, and may be formed of, for example, a PTC (Positive Temperature Coefficient) element.

As shown in FIG. 1A, the gasket 120 surrounds the rim of the cap assembly 100 and is interposed between the battery can 300 and the cap assembly 100.

The gasket 120 may be made of a material having electrical insulation, impact resistance, elasticity, and durability, for example, a polyolefin or a polypropylene.

The gasket 120 insulates the cap assembly 100 from being electrically connected to the battery can 300. In addition, the gasket 120 prevents the electrolyte stored in the battery can 300 from leaking through a tiny gap between the cap assembly 100 and the battery can 300.

The gasket 120 may be largely divided into a side support part 120a and a horizontal bending part 120b. Specifically, the side support part 120a faces the side of the cap assembly 100, and the horizontal bending part 120b extends from the upper and lower end parts of the side support part 120a and is bent toward the cap assembly 100 to be in contact with the upper and lower surfaces of the cap assembly 100. The side support part 120a of the gasket 120 supports and surrounds the side surface of the cap assembly 100, and the horizontal bending part 120b extending from the upper and lower ends of the side support part 120a presses each upper surface and lower surface of the rim of the cap assembly 100 to completely adhere to the cap assembly 100.

The porous member 130 is disposed between the gasket 120 and the upper cap plate 110 to discharge gas generated in the battery can 300 to the outside.

The porous member 130 includes a porous material to selectively discharge the gas generated inside the secondary battery to the outside.

The material of the porous member 130 includes pores, and is made of a material capable of selectively passing only gas while obstructing the flow of liquid through the pores. For example, the porous member 130 may be made of porous polytetrafluoroethylene (PTFE) material. However, it is preferable that the size of the pores of the porous member 130 is designed to be sufficiently small so as to pass only gaseous body such as gas and not pass the electrolyte inside the secondary battery to the outside. For example, the size of the pores is 0.05 to 5.0 nm, and the air permeability at 1 kPa is 0.05 to 10 cm$^3$/s/cm$^2$.

The porous member 130 may be independently manufactured in the form of a film or a circular ring. Alternatively, the porous member may be manufactured by being coated on the surface of another member. More specifically, the porous member 130 of the present invention may be in the form of at least one among a porous film, a porous coating layer, and a porous ring 130a. Here, the thickness of the porous film, the porous coating layer, and the porous ring 130a is preferably 0.1 mm to 1.0 mm, and more preferably 0.3 mm to 0.8 mm, respectively. When the thickness of the porous member 130 having various shapes is less than 0.1 mm, a large amount of gas cannot smoothly move around, and when the thickness of the porous member 130 exceeds 1.0 mm, the sealing power of the liquid electrolyte inside the secondary battery may be lowered, and the structural stability of the secondary battery may be deteriorated.

The secondary battery of the present invention may have various embodiments depending on the shape, structure, and attachment position of the porous member 130, the gasket 120, and the cap assembly 100.

FIG. 3 relates to a configuration related to a secondary battery according to the first embodiment, FIG. 4 relates to a configuration related to a secondary battery according to the second embodiment, FIG. 5 relates to a configuration related to a secondary battery according to the third embodiment, FIG. 6 to FIG. 7 relate to configurations related to a secondary battery according to the fourth embodiment, FIG. 8 to FIG. 9 relate to configurations related to a secondary battery according to the fifth embodiment, FIG. 10 and FIG. 11 relate to configurations related to a secondary battery according to the sixth embodiment, and FIG. 12 to FIG. 13 relate to configurations related to a secondary battery according to the seventh embodiment.

MODE FOR CARRYING OUT THE INVENTION

First Embodiment

The porous member 130 included in the secondary battery according to the first embodiment may be a porous film in the form a film capable of being attached to the surface of the cap assembly 100 and the surface of the gasket 120 so that it can be interposed between the cap assembly 100 and the gasket 120.

The porous member 130 is interposed between the gasket 120 and the cap assembly 100. More specifically, the porous member 130 may be coupled to at least one among an inner circumferential surface of the gasket 120 facing the cap assembly 100 and an outer circumferential surface of the cap assembly 100 facing the gasket 120.

The porous member 130 may be attached and coupled to the inner circumferential surface of the gasket 120 and extend along the circumferential direction of the gasket 120. In this case, the gasket 120 is coupled to the rim of the cap assembly 100 in a state in which the porous member 130 is attached to the inner circumferential surface of the gasket 120.

FIG. 3 is a perspective view and a partial cross-sectional view of a cap assembly 100 included in a secondary battery according to the first embodiment of the present invention and a gasket 120 coupled thereto.

According to the illustration, the porous member 130 is interposed between the cap assembly 100 and the gasket 120. Here, the cap assembly 100 and the gasket 120 are spaced apart from each other by a predetermined distance by the porous member 130.

The porous member 130 is disposed in contact with the entire inner circumferential surface of the side support part 120a and the horizontal bending part 120b of the gasket 120. In this case, as illustrated, the porous member 130 may be formed by protruding a predetermined length from the end part of the horizontally bending part 120b of the gasket 120.

The porous member 130 serves as a path for gas to move between the cap assembly 100 and the gasket 120. That is, the gas frequently generated from the battery can 300 moves through the porous member 130 interposed between the cap assembly 100 and the gasket 120, and is discharged to the outside by leaving between the upper cap plate 110 of the cap assembly 100 and the gasket 120.

Second Embodiment

The porous member 130 included in the secondary battery according to the second embodiment is additionally formed on the outer circumferential surface of the gasket 120. In this case, like the first embodiment, the porous member 130 is porous film in the form of a film attachable to the surfaces of the cap assembly 100 and the gasket so that it can be interposed between the cap assembly 100 and the gasket 120 and between the battery can 300 and the gasket 120.

Specifically, the porous member 130 is formed on the outer circumferential surface of the gasket 120 opposite to the battery can 300 and extends along the circumferential direction of the gasket 120.

FIG. 4 is a perspective view and a partial cross-sectional view of a cap assembly 100 included in a secondary battery according to the second embodiment of the present invention and a gasket 120 coupled thereto.

According to the illustration, the porous member 130 is formed by being attached to the inner and outer circumferential surfaces of the gasket 120, respectively. In this case, since the gas generated inside the secondary battery can move through two paths, gas discharging efficiency can be further increased. That is, the gas generated from time to time in the battery can 300 moves through the porous member 130 interposed between the cap assembly 100 and the gasket 120 and the porous member 130 interposed between the battery can 300 and the gasket 120, and is discharged to the outside by leaving between the cap assembly 100 and gasket 120 and between the battery can 300 and the gasket 120, respectively.

Third Embodiment

The porous member 130 included in the secondary battery according to the third embodiment is coated on the edge of the gasket 120 or the cap assembly 100. For example, the porous member 130 may be coated on the entire surface of the gasket 120, instead of being made of a film in a separate process and attached to the cap assembly 100, the gasket 120, etc.

FIG. 5 is a perspective view and a partial cross-sectional view of a cap assembly 100 included in a secondary battery according to the third embodiment of the present invention and a gasket 120 coupled thereto.

According to the illustration, the porous member 130 covers the entire surface of the gasket 120. In this case, since it is possible to omit the process of manufacturing the porous member 130 separately and attaching it to the cap assembly 100, the gasket 120, etc., manufacturing efficiency can be increased. In addition, gas generated inside the secondary battery can move through two paths as in the second embodiment, and since the porous member 130 is formed in a wider area than in the second embodiment, gas discharging efficiency can be improved.

Fourth Embodiment

The porous member 130 of the present invention may be a ring-shaped porous ring 130a extending along the circumferences of the gasket 120 and the cap assembly 100.

FIG. 6 is a perspective view and a partial cross-sectional view of a porous ring 130a of the present invention.

The porous ring 130a may have a circular cross-section as shown, but may also have a polygonal shape such as a triangle or a quadrangle.

The ring-shaped porous member 130 as described above does not need to be manufactured with the shape and structure of the cap assembly 100 or the gasket 120 in mind as in the first and the second embodiments, and as in the third embodiment, a process of coating the porous member 130 on the surface of the gasket 120 may also be omitted. Therefore, the manufacturing efficiency of the secondary battery can be improved. In addition, since a plurality of porous rings 130a having various diameters can be installed on the cap assembly 100, there is an advantage in that it is easy to control the gas discharge performance.

At least one or more porous rings 130a may be disposed between the horizontal bending part 120b of the gasket 120 and the upper surface of the cap assembly 100 and between the horizontal bending part 120b and the lower surface of the cap assembly 100, respectively. For example, two or more porous rings 130a may be disposed on the upper and lower surfaces of the cap assembly 100, respectively.

FIG. 7 is a perspective view and a partial cross-sectional view of a cap assembly 100 included in a secondary battery according to the fourth embodiment of the present invention and a gasket 120 coupled thereto.

As illustrated, the porous ring 130a may be interposed between the cap assembly 100 and the gasket 120 at the upper and lower parts of the cap assembly 100. Although not illustrated, the porous ring 130a may be interposed between the side surface of the cap assembly 100 and the side support part 120a of the gasket 120.

A gas discharge passage connected to the porous ring 130a is formed between the inner circumferential surface of the gasket 120 and the outer circumferential surface of the cap assembly 100 opposite to the inner circumferential surface of the gasket 120. Specifically, the gasket 120 and the cap assembly 100 maintains a state in which they are spaced apart in a predetermined distance as the porous ring 130a is interposed therebetween, and the above distance forms a gas discharge passage through which gas can move. Since the gas discharge passage selectively moves gas by the porous ring 130a, electrolyte and the like inside the secondary battery is not discharged to the outside through the gas discharge passage.

Meanwhile, when the porous ring 130a is not interposed between the side surface of the cap assembly 100 and the side support part 120a of the gasket 120, there may be a problem in that the gas discharge passage is blocked by the side surface of the cap assembly 100 coming into close contact with the side support part 120a of the gasket 120. Therefore, in this case, the cap assembly 100 may be designed to be spaced apart from the gasket 120 by a predetermined distance. For example, the diameter of the cap assembly 100 may be smaller than the diameter of the inner circumferential surface of the gasket 120.

Fifth Embodiment

When the secondary battery of the present invention includes the porous ring 130a, the gasket 120 may have a venting groove (a) formed on the inner circumferential surface and extending along the inner circumferential surface, or the venting groove (a) may be formed partially thereof.

FIG. 8 is a perspective view and a cross-sectional view of a gasket 120 included in a secondary battery according to the fifth embodiment of the present invention.

According to the illustration, the venting groove (a) is formed on the inner circumferential surface of the gasket 120 and extending along the circumferential direction of the gasket 120.

The venting groove (a) is formed to allow the gas to move more smoothly by widening the gap between the side surface of the cap assembly 100 and the side support part 120a of the gasket 120.

The venting groove (a) is preferably formed on the side support part 120a of the gasket 120.

FIG. 9 is a cross-sectional view and a partially enlarged view of a secondary battery according to the fifth embodiment of the present invention.

Even if the side surface of the cap assembly 100 and the side support part 120*a* of the gasket 120 are in close contact with each other, a certain gas movement spacing is formed by the venting groove (a) as shown. That is, a gas discharge passage is formed between the venting groove (a) and the outer circumferential surface of the cap assembly 100.

However, in order for the gas to move, it is preferable that the size of the venting groove (a) be larger than the thickness of the cap assembly 100.

Sixth Embodiment

When the secondary battery of the present invention includes the porous ring 130*a*, venting grooves (a) may be formed by being spaced at a predetermined distance along the inner circumferential surface of the gasket 120.

FIG. 10 is a perspective view and a cross-sectional view of a gasket 120 included in a secondary battery according to the sixth embodiment of the present invention.

According to the illustration, the venting groove (a) is formed by being spaced apart at a certain distance along the inner circumferential surface of the gasket 120. In this case, among the inner circumferential surface of the gasket 120, the space between the venting grooves (a) adheres to and supports the side surface of the cap assembly 100 inserted inward, and the space where the venting groove (a) is formed is spaced apart from the side surface of the cap assembly 100 by a predetermined distance to form a gas discharge passage.

FIG. 11 is a cross-sectional view and a partially enlarged view of a secondary battery according to the sixth embodiment of the present invention.

According to the illustration, the secondary battery according to the sixth embodiment moves gas through the venting groove (a) similarly to the fifth embodiment. Since the space of the venting groove (a) of the gasket 120 included in the secondary battery according to the sixth embodiment is relatively small compared to the venting groove (a) included in the gasket 120 of the secondary battery of the fifth embodiment, the gas discharging efficiency may be slightly lowered, but the effect of fixing to the side surface of the cap assembly 100 by the gasket 120 is more outstanding.

However, similar to the fifth embodiment, in order for the gas to move, it is preferable that the size of the venting groove (a) be larger than the thickness of the cap assembly 100.

Seventh Embodiment

When the secondary battery of the present invention includes the porous ring 130*a*, the cap assembly 100 may include a concave part (b) spaced apart from each other at a certain distance along the outer circumferential surface. This feature is the same even when a plurality of configurations is included in the cap assembly 100. For example, when the cap assembly 100 includes an upper cap plate 110, a safety vent 140, etc., the concave part (b) is formed in both the upper cap plate 110 and the safety vent 140. In this case, in the upper cap plate 110 and the safety vent 140, the positions of the concave part (b) formed in the upper cap plate 110 and the concave part (b) formed in the safety vent 140 coincide with each other.

FIG. 12 is an exploded perspective view of a cap assembly 100 of a secondary battery according to the seventh embodiment of the present invention.

According to the illustration, the concave part (b) spaced apart from each other in a certain distance is formed on the rims of the upper cap plate 110 and the safety vent 140 bonded to the lower part of the upper cap plate 110, respectively.

The safety vent 140 is coupled to the lower part of the upper cap plate 110 by adjusting the position of the concave part (b) such that the position of the concave part (b) of the upper cap plate 110 coincides with the concave part (b) of the safety vent 140.

FIG. 13 is a cross-sectional view and a partially enlarged view of a secondary battery according to the seventh embodiment of the present invention.

According to the illustration, among the side surfaces of the cap assembly 100, the space between the concave parts (b) is in close contact with the side support part 120*a* of the gasket 120, and the space where the concave part (b) is formed becomes a gas discharge passage through which the gas moves.

In the cap assembly 100 included in the secondary battery according to the seventh embodiment, the concave part (b) includes a gas discharge passage between the inner circumferential surfaces of the gasket 120, and similar to the sixth embodiment, the gas is discharged to the outside through a gas discharge passage formed by being spaced apart at a predetermined distance along the circumferential direction of the cap assembly 100 or the gasket 120.

In the case of the seventh embodiment, unlike the fifth and sixth embodiments in which the venting groove 121 is formed on the inner circumferential surface of the gasket 120 to form a gas discharge passage, it has an advantage of high manufacturing convenience of the secondary battery in that there is no need to limit the size or the shape or the like of the concave part (b).

In the above, the present invention has been described in more detail through diagrams and exemplary embodiments. However, the diagrams described in the present specification or the configurations described in the exemplary embodiments, and the like are only one embodiment of the present invention and do not represent all of the technical spirit of the present invention, so it should be understood that there may be various equivalents and modifications that can replace them at the time of this application.

REFERENCE NUMERALS

100: Cap Assembly
110: Upper Cap Plate
111: Gas Hole
120: Gasket
120*a*: Side Support Part
120*b*: Horizontal Bending Part
130: Porous Member
130*a*: Porous Ring
140: Safety Vent
150: Current Blocking Element
200: Electrode Assembly
210: Electrode Lead
300: Battery Can
310: Beading Part
320: Crimping Part
400: Insulation Plate
a: Venting Groove
b: Concave Part
G: Gas Movement Path

The invention claimed is:

1. A secondary battery comprising:

an electrode assembly;

a battery can in which the electrode assembly is accommodated;

a cap assembly comprising an upper cap plate defining a positive terminal, the cap assembly being disposed above the battery can;

a gasket surrounding a rim of the cap assembly and interposed between the battery can and the cap assembly; and a porous member disposed between the cap assembly and the gasket to discharge gas generated in the battery can to outside the battery can.

2. The secondary battery of claim 1, wherein the cap assembly further comprises a safety vent coupled to a lower part of the upper cap plate, the safety vent protruding downward, and wherein the safety vent is configured to be displaced upward and break when the pressure inside the battery can rises above a set pressure.

3. The secondary battery of claim 1, wherein the cap assembly further comprises a current blocking element having at least a part of an upper part electrically connected to the upper cap plate and a lower part electrically connected to the electrode assembly, and wherein the current blocking element is configured to block electrical connection with at least one among the upper cap plate and the electrode assembly when the pressure inside the battery can rises above a set pressure.

4. The secondary battery of claim 1, wherein the porous member is coupled to at least one among an inner circumferential surface of the gasket facing the cap assembly and an outer circumferential surface of the cap assembly facing the gasket.

5. The secondary battery of claim 4, wherein the porous member is additionally located on an outer circumferential surface of the gasket opposite to the battery can.

6. The secondary battery of claim 1, wherein the porous member is a porous film surrounding a rim of the gasket or the rim of the cap assembly.

7. The secondary battery of claim 1, wherein the porous member is a porous coating layer coated on a rim of the gasket or the rim of the cap assembly.

8. The secondary battery of claim 1, wherein the porous member is a porous ring extending along a circumference of the gasket and a circumference of the cap assembly.

9. The secondary battery of claim 6, wherein the porous film has a thickness of 0.1 mm to 1.0 mm.

10. The secondary battery of claim 1, wherein the porous member has a pore size of 0.05 μm to 5.0 μm, and an air permeability at 1 kPa of 0.05 $cm^3/s/cm^2$ to 10 $cm^3/s/cm^2$.

11. The secondary battery of claim 8, wherein the gasket comprises a side support part facing a side part of the cap assembly and a bending part extending from upper and lower ends of the side support part, the bending part being bent toward the cap assembly to contact an upper surface and a lower surface of the cap assembly, and wherein one or more porous rings are disposed between the bending part of the gasket and the upper surface of the cap assembly and between the bending part of the gasket and the lower surface of the cap assembly, respectively.

12. The secondary battery of claim 8, wherein a gas discharge passage connected to the porous ring is located between an inner circumferential surface of the gasket and an outer circumferential surface of the cap assembly opposite to the inner circumferential surface of the gasket.

13. The secondary battery of claim 12, wherein a venting groove is located on the inner circumferential surface of the gasket, the venting groove extending entirely or partially along the inner circumferential surface of the gasket, and wherein the gas discharge passage is located between the venting groove and the outer circumferential surface of the cap assembly.

14. The secondary battery of claim 13, wherein the venting groove is provided as a plurality of venting grooves spaced apart along the inner circumferential surface of the gasket by a predetermined distance.

15. The secondary battery of claim 12, wherein the outer circumferential surface of the cap assembly includes a plurality of concave parts spaced apart along the outer circumferential surface of the cap assembly by a predetermined distance, and wherein the gas discharge passage is located between the concave parts and the inner circumferential surface of the gasket.

16. The secondary battery of claim 7, wherein the porous coating layer has a thickness of 0.1 mm to 1.0 mm.

17. The secondary battery of claim 8, wherein the porous ring has a thickness of 0.1 mm to 1.0 mm.

* * * * *